June 11, 1929.  W. C. READEKER  1,717,063
MOTION PICTURE MACHINE
Filed Oct. 1, 1926   2 Sheets-Sheet 1

INVENTOR
William C. Readeker
BY
his ATTORNEY

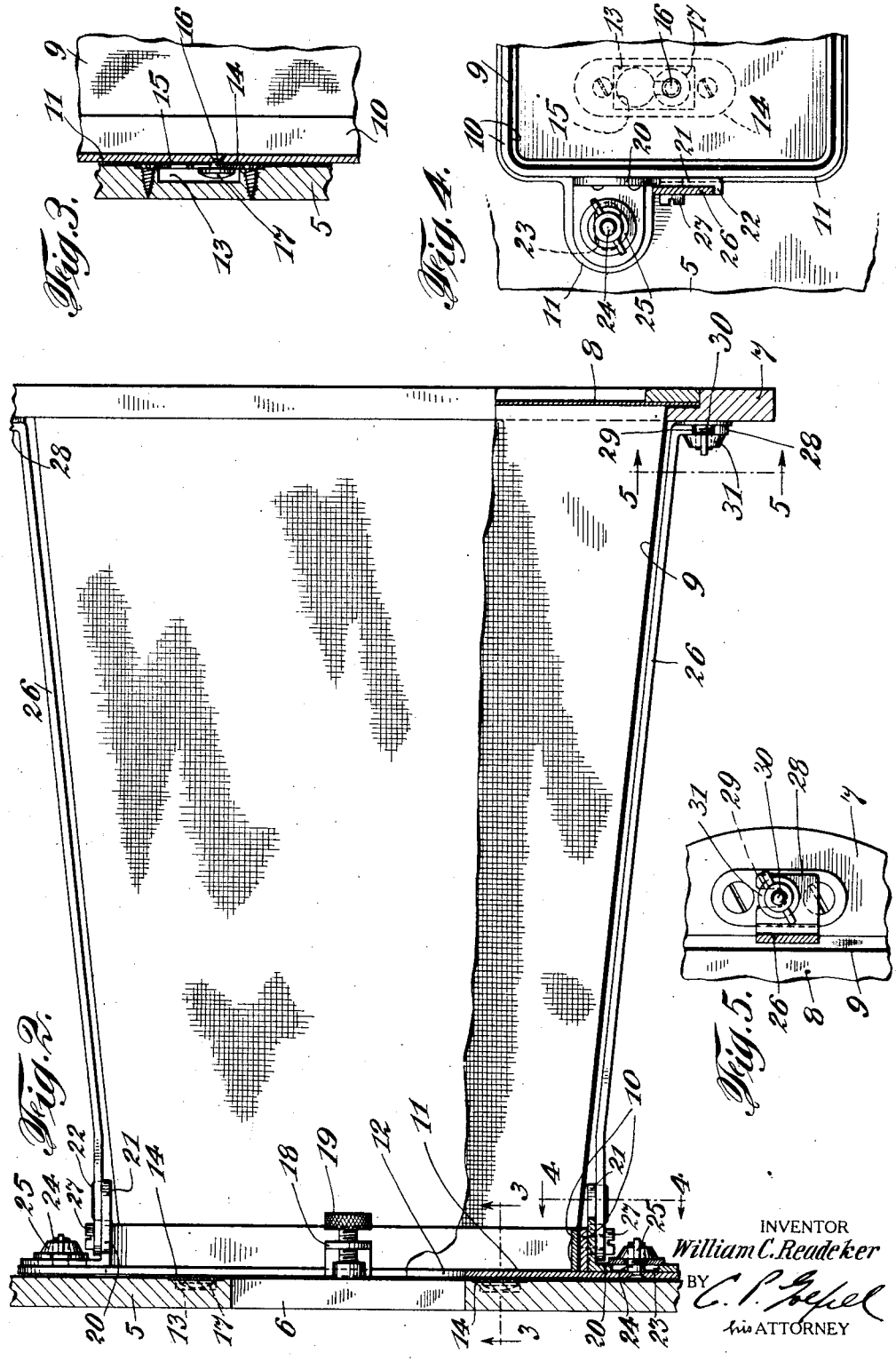

Patented June 11, 1929.

1,717,063

UNITED STATES PATENT OFFICE.

WILLIAM C. READEKER, OF NEW YORK, N. Y.

MOTION-PICTURE MACHINE.

Application filed October 1, 1926. Serial No. 138,818.

This invention relates to motion picture machines, and more particularly to a portable machine of the continuous film type designed primarily for use in connection with window display advertising.

It is the primary object and purpose of the invention to provide improved supporting and attaching means for the rear projection screen of such motion picture machines or cameras and which will enable the proper adjustments to be easily and quickly made for the purpose of accurately focusing the pictures on the screen.

It is a more particular object of the invention to provide a flexible hood attached at one of its ends to the rear side of the screen frame, a plate and means for detachably connecting the same with a wall of the projection machine case, means connecting the other end of said hood with the plate for lateral adjustment relative thereto, and additional means for adjusting the plane of said plate relative to the plane of the wall upon which it is mounted.

It is another object of the invention to provide rigid bracing members connecting said laterally adjustable means on the end of the hood with the screen frame, said members being detachable from said frame and permitting of the collapse of said flexible hood when the machine is not in use.

With the above and other objects in view, the invention consists in the improved motion picture machine, and in the form, construction and relative arrangement of its several parts as will be hereinafter more fully described, illustrated in the accompanying drawings, and subsequently incorporated in the subjoined claims.

Referring in detail to the drawings, wherein I have disclosed one simple and practical embodiment of my present improvements, and in which similar reference characters designate corresponding parts throughout the several views:—

Fig. 2 is a horizontal sectional view taken substantially on the line 2—2 of Fig. 1;

Fig. 3 is a detail vertical section taken on the line 3—3 of Fig. 2;

Fig. 4 is a sectional view taken on the line 4—4 of Fig. 2, and

Fig. 5 is a detail section taken on the line 5—5 of Fig. 2.

Figure 1:
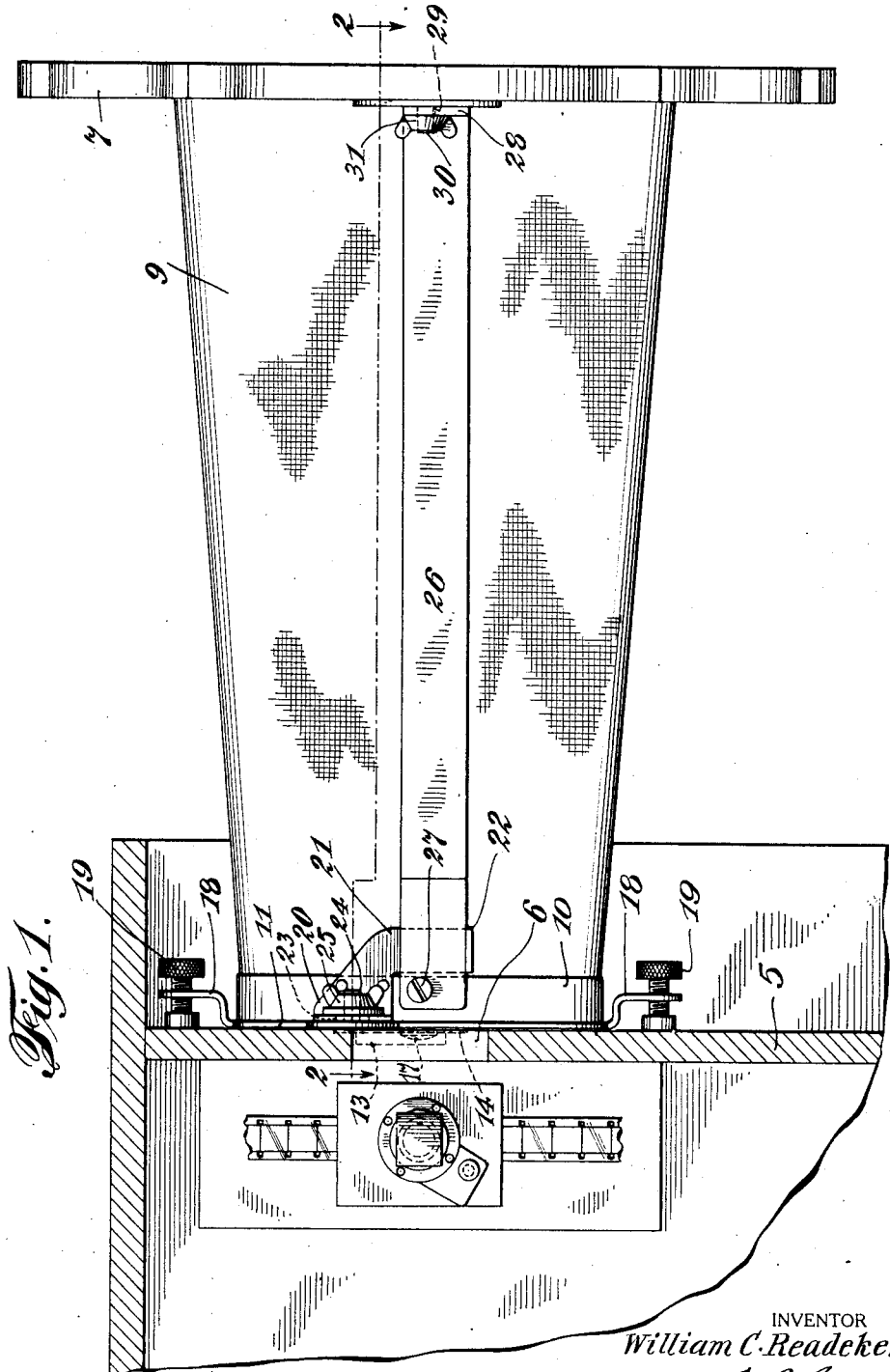
Figure 1 is a sectional view through one wall of the case of the picture projecting machine showing my present improvements applied thereto.

The motion picture projecting mechanism of the continuous film type in conjunction with which the present invention is employed is not herein illustrated in detail since it constitutes no essential feature of the invention. For the purposes of this explanation, it will suffice to state that this projecting mechanism preferably embodies the essential features of the disclosures contained in patents numbered 1,542,408 and 1,542,409, issued January 16, 1925. This mechanism is entirely contained or enclosed within a suitable carrying case of the requisite proportions which includes the wall indicated at 5 having a light opening 6 through which the pictures are projected on a suitable screen.

While the rear projection screen may be of any approved type, I have herein shown a suitably constructed frame 7 in which the translucent screen plate 8 is secured. To the rear side of the frame 7 one end of the tubular flexible wall of a hood 9 is suitably attached. The other end edge of this tubular hood wall is secured between the inner and outer metal bands 10.

A metal plate 11 having an opening 12 therein corresponding in form and dimensions with the light opening 6 is adapted to be detachably mounted upon the outer face of the case wall 5 with said openings in registering relation. For this purpose, I preferably provide the wall 5 at each side of the opening 6 with a recess 13 in its outer face, the open side of which is covered by a metal plate 14 having a keyhole slot 15 therein. Studs 16 are fixed in the plate 11 and provided with heads 17 for engagement through the enlarged ends of the slots 15. The shanks of these studs are of such length that when engaged in the slots 15, there is a slight play between the plate 11 and the wall 5, or in other words, this plate is not secured in tight abutting contact against the face of the wall. At its upper and lower edges the plate 11 is provided with angularly offset arms 18 in which the adjusting screws 19 have threaded engagement. By adjusting these screws into bearing contact against the wall 5, the plate 11 may be positioned and rigidly held at a slight inclination relative to the face of the wall 5. The purpose of this adjustment will become clear as the description proceeds.

Upon each side of the outer metal band 10 on the end of the flexible hood 9 one arm of a bracket member 20 is riveted or otherwise rigidly fixed, said bracket arm being formed with an extension 21 terminating in a laterally projecting lug 22. The other arm of each bracket member 20 is provided with a horizontal slot 23 therein to receive a threaded stud 24 fixed in the plate 11. Clamping nuts 25 of suitable form are threaded on these studs. Thus, it will be apparent that by the adjustment of these nuts, the bracket arms can be tightly clamped against the plate 11 to secure the rigid metal bands 10 on the end of the hood wall in properly adjusted relation with respect to the opening 12 in said plate.

In order that such adjustment will be also imparted to the screen 8, I provide a pair of rigid metal bars 26 arranged at opposite sides of the hood 9, one end of each of said bars being pivotally connected as by means of the screw 27 to one side of the outer metal band 10. The other end of each brace bar is formed with a lateral extension 28 having an upwardly opening slot or recess 29 therein to receive a threaded stud or screw 30 fixed in the screen frame 7. By means of the nuts 31, these ends of the brace bars can thus be rigidly fixed to the rear side of the screen frame. As clearly seen in Fig. 1 of the drawings, the lower edges of the brace bars 26 adjacent their pivoted ends rest upon the lugs 22 of the extensions 21 of the respective brackets 20 to sustain said brace bars in a horizontal position and thus properly support the screen frame. By the provision of these brace bars, it will be apparent that when the rear end of the hood is laterally adjusted relative to the plate 11, the frame 7 and screen 8 will be similarly adjusted with respect to the line of projection of the light beam. Likewise, when the screws 19 are adjusted against the case wall 5, the entire attachment including the plate 11 will be vertically tilted relative to the plane of the wall 5. In this manner, I am enabled to quickly obtain a very accurate adjustment of the screen so that the pictures projected through the opening 6 will be accurately focused thereon. After the proper adjustment of the screen has been secured, it will be apparent that the latter will be rigidly held or supported without requiring the use of additional standards or props therefor.

When the apparatus is to be removed from the window or other place of display, by merely loosening the adjusting screws 19, the plate 11 can be quickly detached from the wall 5 of the machine case. By then loosening nuts 31 the brace bars 26 may be disconnected from the rear side of the screen frame and swung on their pivots 27 so that the flexible wall of the hood 9 can be folded or collapsed against the rear side of the screen frame. Thus, the attaching parts of the screen may be compactly positioned so that the screen with its attaching means can be easily and conveniently transported from place to place.

In the foregoing description and the accompanying drawings, I have disclosed an embodiment of my improvements which I have found to be very satisfactory in practical use. It is nevertheless, to be understood that the essential features thereof might also be incorporated in various other alternative mechanical structures, and I accordingly reserve the privilege of resorting to all such legitimate changes in the form, construction and relative arrangement of the various parts as may be fairly considered within the spirit and scope of the invention as claimed.

I claim:

1. In combination with the case of a motion picture projection machine having a wall provided with a light aperture, a rear projection screen adapted to be arranged in advance of said aperture, and means for detachably supporting said screen upon the case wall, said means including a metal plate and means for detachably mounting said plate upon the face of said case wall, a flexible tubular hood attached at one of its ends to the rear side of the screen, means for adjustably mounting the other end of said hood upon said plate for lateral movement relative to the light aperture, rigid brace members connected with the latter end of the hood, and means for connecting said brace members to the rear side of the screen.

2. In combination with the case of a motion picture projection machine having a wall provided with a light aperture, a rear projection screen adapted to be arranged in advance of said aperture, and means for detachably supporting said screen upon the case wall, said means including a metal plate and means for detachably mounting said plate upon the face of said case wall, a flexible tubular hood attached at one of its ends to the rear side of the screen, means connected to the other end of said hood and adjustably mounted on said plate to position said end of the hood relative to the light aperture, and means connected with said adjustable means and the screen to sustain the screen in spaced relation to the wall of the case and cause a corresponding adjustment of the screen relative to the light aperture.

3. In combination with the case of a motion picture projection machine having a wall provided with a light aperture, a rear projection screen adapted to be arranged in advance of said aperture, and means for detachably supporting said screen upon the case wall, said means including a metal plate and means for detachably mounting said plate upon the face of said case wall, a flexible tubular hood attached at one of its ends to the rear side of the screen, means for detachably connecting the other end of said hood with said plate, means connected with the latter end of the hood to sustain the screen in spaced relation to the wall of the case and prevent collapse of the hood, and means carried by said plate adjustable relative thereto and adapted to coact with the case wall to position the screen in a desired plane relative to the plane of said wall.

4. In combination with the case of a motion picture machine having a wall provided with a light aperture, a screen adapted to be arranged in advance of said aperture, and means for detachably supporting said screen from the case wall including a plate, means for detachably mounting the same upon the face of said wall, a flexible tubular hood attached at one of its ends to the rear side of the screen, means connecting the other end of said hood with said plate for lateral adjustment relative to the light aperture, rigid brace members pivotally connected at one of their ends with the latter means, relatively fixed stop means limiting the pivotal movement of said brace members in one direction to sustain the same in a substantially horizontal position, and means for removably supporting the screen on the other ends of said brace members whereby the hood is supported against collapse and said lateral adjustment thereof is transmitted to said screen.

5. In combination with the case of a motion picture machine having a wall provided with a light aperture, a screen adapted to be arranged in advance of said aperture, and means for detachably supporting said screen from the case wall including a plate, means for detachably mounting the same upon the face of said wall, a flexible tubular hood attached at one of its ends to the rear side of the screen, means connecting the other end of said hood with said plate for lateral adjustment relative to the light aperture, rigid brace members pivotally connected at one of their ends with the latter end of the hood, stop means limiting the pivotal movement of said brace members in one direction to sustain the same in a substantially horizontal position, means for removably supporting the screen on the other ends of said brace members whereby the hood is supported against collapse and said lateral adjustment thereof is transmitted to said screen, and adjustable means carried by said plate and adapted to coact with the case wall to angularly move said plate and position the plane of the screen relative to the plane of said wall.

6. In combination with the case of a motion picture projection machine having a wall provided with a light aperture, a rear projection screen, and means for supporting said screen from the case wall in spaced relation to the light aperture, said means including a pair of rigid brace members attached at one of their ends to the rear of the screen adjacent its opposite side edges, means arranged between and connected with the other ends of said brace members, and means for detachably mounting the latter means upon the case wall and for lateral adjustment with respect to the light aperture to thereby properly focus the picture projecting light beam upon the screen.

7. In combination with the case of a motion picture projection machine having a wall provided with a light aperture, a rear projection screen, and means for supporting said screen from the case wall in spaced relation to the light aperture, said means including a pair of rigid brace members attached at one of their ends to the rear of the screen adjacent its opposite side edges, means arranged between and connected with the other ends of said brace members, means for detachably mounting the latter means upon the case wall consisting of an apertured plate and means for loosely attaching said plate to the case wall around the light aperture, means carried by said connecting means between the brace members adjustably attached to said plate for lateral movement thereon relative to the light aperture, and additional adjustable means carried by said plate and coacting with the case wall to vertically tilt said plate and the parts mounted thereon to thereby position the screen in a desired plane relative to the case wall and properly focus the picture projecting light beam thereon.

In testimony that I claim the foregoing as my invention, I have signed my name hereto.

WILLIAM C. READEKER.